United States Patent
Palatov et al.

(10) Patent No.: US 11,519,998 B2
(45) Date of Patent: Dec. 6, 2022

(54) METHODS FOR GEOLOCATION USING ELECTRONIC DISTANCE MEASUREMENT EQUIPMENT

(71) Applicant: SECOND BRIDGE INC., Beverly Hills, CA (US)

(72) Inventors: Dennis Palatov, Portland, OR (US); Marc Ganouna, Beverly Hills, CA (US); Pete Stoppani, Redmond, WA (US)

(73) Assignee: SECOND BRIDGE INC., Beverly Hills, CA (US)

( * ) Notice: Subject to any disclaimer, the term of this patent is extended or adjusted under 35 U.S.C. 154(b) by 111 days.

(21) Appl. No.: 17/272,345

(22) PCT Filed: Aug. 29, 2019

(86) PCT No.: PCT/IB2019/057282
§ 371 (c)(1),
(2) Date: Feb. 28, 2021

(87) PCT Pub. No.: WO2020/044278
PCT Pub. Date: Mar. 5, 2020

(65) Prior Publication Data
US 2021/0325502 A1 Oct. 21, 2021

(30) Foreign Application Priority Data
Aug. 30, 2018 (FR) .................................. 18 70967

(51) Int. Cl.
*G01S 5/14* (2006.01)
*G01S 5/02* (2010.01)

(52) U.S. Cl.
CPC .......... *G01S 5/0244* (2020.05); *G01S 5/0264* (2020.05); *G01S 5/14* (2013.01)

(58) Field of Classification Search
CPC .... G01S 5/0244; G01S 5/0264; G01S 5/0289; G01S 5/02025; G01S 5/0263; G01S 5/14
(Continued)

(56) References Cited

U.S. PATENT DOCUMENTS

2009/0212995 A1 8/2009 Wu et al.
2016/0100290 A1\* 4/2016 Smith .................... G01S 5/0263
455/456.1

FOREIGN PATENT DOCUMENTS

EP 2 395 367 A1 12/2011
WO 2016/094681 A1 6/2016
(Continued)

OTHER PUBLICATIONS

Ash Mohammad Abbas, "TrustLP: A Trust-Based Localization Protocol for Wireless Sensor Networks," 2015 13th International Symposium on Modeling and Optimization in Mobile, Ad Hoc, and Wireless Networks (WiOpt), IFIP, May 25, 2015, pp. 529-536.
(Continued)

*Primary Examiner* — Harry K Liu
(74) *Attorney, Agent, or Firm* — Im IP Law PLLC; Chai Im; C. Andrew Im (57) ABSTRACT

Methods for geolocation utilizing electronic distance measurement equipment. The methods select a small subset of available data that is most trustworthy, and then mathematically treats the subset of data (preferably bilateration or trilateration) to compute one or more new measured position candidates. One measured position candidate may be chosen among the measure position candidates based on confidence metrics, relative position geometry, and the comparison with history-based predicted position and its respective confidence metric. In a case where no measured position candidates of sufficient confidence are available, the predicted position is taken as the new position.

12 Claims, 8 Drawing Sheets

(58) Field of Classification Search
USPC .......................................................... 342/451
See application file for complete search history.

(56) References Cited

FOREIGN PATENT DOCUMENTS

WO  WO-2016094681 A1 *  6/2016  ............. G01S 19/48
WO  WO-2018064581 A1 *  4/2018  ............. G01S 13/72

OTHER PUBLICATIONS

David K Goldenberg et al., "Localization in sparse networks using sweeps," MOBICOM '06 12th Annual International Conference on Mobile Computing and Networking, Sep. 29, 2006, pp. 110-121, ACM, New York, NY, USA.

* cited by examiner

METHODS FOR GEOLOCATION USING ELECTRONIC DISTANCE MEASUREMENT EQUIPMENT

RELATED APPLICATIONS

This application is a § 371 application of PCT/IB2019/057282 filed Aug. 29, 2019, which claims priority from French Patent Application No. 18 70967 filed Aug. 30, 2018, each of which is incorporated herein by reference in its entirety.

FIELD OF THE INVENTION

The present invention relates to methods for geolocation utilizing electronic distance measurement equipment.

BACKGROUND OF THE INVENTION

With the advent of low-cost, low power radio distance measurement technologies such as UWB (Ultra Wide Band), RFID (Radio Frequency Identification) and others, there has been growing demand for deploying geolocation systems to keep track of people and assets. In common implementations, the technology works by measuring distances between a movable Node, commonly referred to as Tag, and a plurality of stationary nodes who's positions are known, commonly referred to as Anchors. Once a set of distances to multiple Anchors is measured, geometric calculations are performed to determine the location of the moving Tag Node. A number of such systems are known, for example those using the DW1000 integrated circuit from Decawave.

One challenge is that the range for distance measurements using typical equipment is variable and often very limited. Typical achievable measurement distances range from as much as 200 meters to less than 10 meters. This requires a large number of closely positioned Anchors to achieve reliable geolocation, which is not always practical.

In common indoor and outdoor locations, there is a constantly changing radio signal environment including stationary and moving obstructions, reflections, signal loss and interference from other radio transmissions. As a Tag Node moves through this environment, signals from several Anchors may be available, but often at least some of the distance measurements obtained at any one time may have very significant errors due to the above factors.

A number of mathematical filtering techniques are commonly used to mitigate the effects of erroneous measurements on the calculated position. In most cases these techniques are variations of Kalman filters which use multi-parameter vector calculations to predict next state from a previous state, position being among the parameters in a state, and then perform weighted averaging between predicted and calculated positions. Data from sensors such as accelerometers, magnetometers, gyroscopes, as well as physical behavior models, is often included as parameters in the calculations.

For calculating the position, since there is no known means to determine which distance measurements are erroneous and which are not, it is common practice to use all available distance measurements and use iterative techniques to solve multiple simultaneous equations until acceptable convergence is achieved. Another known approach is to use bilateration to calculate circle-circle intersections (CCI) with each available pair of Anchors, then identify solutions that cluster together in an attempt to select a subset of solutions most likely to be correct. Filtering is then performed on the selected set of solutions only. This type of approach can perform better as the number of available measurements is increased but is not useful to resolve the inherent ambiguity when only two measurements are available.

The geolocation task is complicated by the fact that depending on specific geometric relationship between locations of available Anchors and the moving Tag, or temporary loss of signal from one or more Anchors, several possible mathematical solutions or clusters of solutions may exist. The multiple possible solutions can be tens or even hundreds of meters apart and geometrically equally valid with no mathematical means to induce a preference of one over another. In such cases the geolocation algorithm must choose one with little or no basis for making the choice, and an incorrect choice can therefore result in very significant position error.

When measurements to a sufficient number of Anchors (3 or more in 2D movement, 4 or more in 3D movement) are not available, some systems attempt to use other Tags (moving nodes) as distance references. However, since the computed location of a moving Tag may itself contain error, any such error would then propagate into all calculations based upon using such location as a reference. As in other cases, commonly used filtering techniques can reduce the proportional contribution of erroneous measurements but not eliminate it entirely.

What is needed is a method of determining the relative trustworthiness of a plurality of distance measurements for a Node, identifying the erroneous ones, and only using the measurements least likely to contain error for calculating a position. In cases where multiple valid mathematical solutions exist, a method of selecting the correct solution is needed. It is also desirable to determine the relative trustworthiness of the resulting calculated position, and to utilize this metric in cases where this position may be used as a reference for calculating positions of other Tag Nodes.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

A primary objective of the present invention is to provide a means of determining which among a set of available distance measurements are less likely to contain errors than the others.

A second objective is to provide a means for optimally choosing one of a plurality of possible candidates for a new Position.

A third objective is to provide a means for determining the trustworthiness of a newly calculated Position.

To achieve its objectives the present invention introduces a key metric of Confidence and a secondary metric of Precision as attributes of a Position of a Node, along with the customary X, Y and Z coordinates.

Confidence is a metric that is calculated in real time in accordance with the methods of the present invention, which are disclosed in detail herein. The use of Confidence metric can take many forms in various embodiments. Broadly, within the context of the present invention, Confidence is a numerical parameter indicating the relative trustworthiness of information used to determine any given node's Position. Other terms may be used in some embodiments to represent the same concept without departing from the scope of the invention.

Precision, within the context of the present invention, is the inherent accuracy of the electronic distance measurement technology being utilized and is typically determined through experimental testing by device manufacturers. Precision is utilized to judge the magnitude of any apparent error relative to the best-case capabilities of the technology. For instance, if Precision is 2 meters, a 1 meter error in location may be deemed negligible, while a 10 meter error would be considered significant. For currently available distance measurement technologies Precision can range from centimeters to tens of meters. Within the context of the present invention Precision is used as a numerical reference and context for the Confidence metric. It should be noted that the use of a Precision metric is an enhancement, rather than a fundamental feature of the present invention. Many embodiments are possible that do not explicitly reference Precision.

The methods of the present invention comprise two fundamental tasks in determining a new Position. The first is the calculation of a Predicted Position of a Node which is a Tag, based on one or more previous Positions and a plurality of sensor inputs which may include inertial, magnetic and other types, and then determining a Confidence metric for said Predicted Position.

The second task is the measurement of a plurality of distances to a plurality of other Nodes which may be Anchors or other Tags. Said methods comprise calculation of Confidence metric for each of the measured distances, then choosing among said distances based on such Confidence metrics to determine which among them should be used for calculating one or more new Measured Position candidates. A Confidence metric is then computed for each new Measured Position candidate based on Confidence metrics of the distances used to calculate it, the associated Precision, and geometric conditions.

The respective Confidence metrics of the Predicted Position and each Measured Position candidate are then compared against others to choose which among the possible new Position candidates should be selected as the new Position.

The approach disclosed herein is fundamentally different from established industry practice of gathering all available data and then computing a new filtered Position based on complex mathematical manipulation of said data. Statistical methods such as Covariance computations are often used in prior art to potentially exclude some of the available data in an attempt to improve accuracy. The present invention instead teaches methods for picking a small subset of available data that is most trustworthy, and then using simple mathematical treatment of said subset of data (preferably bilateration or trilateration) to compute one or more new Measured Position candidates, among which one may be chosen based on Confidence metrics, relative Position geometry, and the comparison with history-based Predicted Position and its respective Confidence metric. In a case where no Measured Position candidates of sufficient Confidence are available, the Predicted Position is taken as the new Position.

BRIEF DESCRIPTION OF THE DRAWINGS

The present invention is described herein with reference to the following drawings.

DETAILED DESCRIPTION OF AN EMBODIMENT OF THE INVENTION

Figure 1:
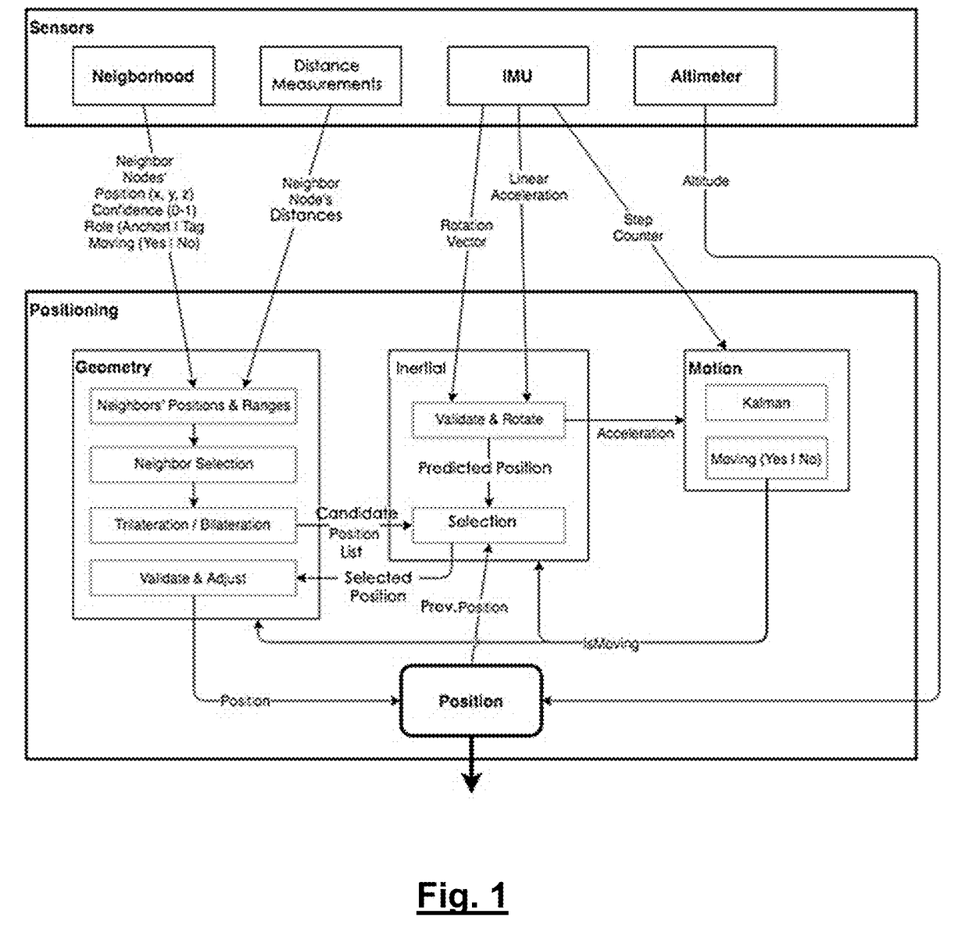
FIG. 1 shows an overall data flow diagram of an embodiment of the present invention.

FIG. 1 is a diagram of the overall data flow for an illustrative embodiment of the present invention.

In order to determine a node's Position, information is gathered from a variety of sensors. In the context of the illustrated embodiment, the position data of neighboring nodes and the measured distances to such nodes are considered sensor inputs. Other typical sensors include inertial measurement unit (IMU), magnetometer, altimeter and the like.

In the illustrated embodiment, the IMU and altimeter are contained within the hardware portion of a node.

Information about the locations of neighboring nodes is transmitted to the node via a data radio. In some embodiments, a single node will be designated as the Neighborhood Manager responsible for periodically collecting and disseminating this information among the nodes. In other embodiments, this information may be transferred collaboratively peer-to-peer. Many methods for transferring information among a plurality of nodes are known. The details of such methods are outside the scope of the present invention.

Distance measurements between nodes are performed by means of a distance measuring radio. A number of such methods are known. The illustrated embodiment utilizes Decawave DW1000 distance measuring radios, but a number of others are readily available.

Sensors:
- Altimeter provides relative altitude.
- IMU: The Inertial Measurement Unit such as the BNO080 consists of 3 axis accelerometer, gyroscope and magnetometer. These are typically fused (internally in most modern IMUs) to provide virtual sensors such as linear acceleration and step counter along with a rotation vector to transform the linear acceleration with magnetic North.
- Distance measurement: The Distance measurement module (such as an UWB radio) provides the distances from the current Node to nearby Nodes.
- Neighborhood: In the context of the illustrated embodiment, Neighborhood is a set of Nodes managed by a Node functioning as the Neighborhood Manager (NHM). Each Node broadcasts its position information via XNet. The NHM maintains a Neighborhood Database (NHDB) of the Nodes in its neighborhood. Each Node in the neighborhood receives the position information for each of its neighbors. This information includes:

X, Y, Z coordinates where:
- X is the West (negative) and East (positive) axis,
- Y is the North (positive) and South (negative) axis,
- Z is elevation.

Role:
- Anchor: stationary Node with accurately measured position.
- Tag: moving or stationary Node whose position is calculated via Positioning.
- A stationary Tag is referred to as a Breadcrumb.

State: Moving or Stationary,

Confidence: Key positioning values such as the coordinates and distances have an associated confidence value with a range of 0.0 to 1.0 where 0.0 indicates no confidence and 1.0 indicates absolute confidence. Other numeric scales can be used in different embodiments. Whenever positioning chooses among Node data for calculating a position estimate, it uses the confidence of the data to choose the best (most confident) data.

Only anchors have a pre-assigned and constant confidence, set to 1.0. A tag's confidence is calculated based on the confidence of the data is receives from sensors, distance measurement and neighbor Nodes used to calculate a tag's position.

A tag's Position confidence can decrease over time due to data errors, lack of Precision, and time lag between data updates; confidence decreases with data age. As mentioned above, the confidence never increases on its own, it can only increase if the confidence of incoming new data is higher than currently available data.

Modules:
Positioning consists of the following modules:
- Inertial Navigation System (INS): Given a starting position, the INS module takes inertial inputs from the IMU and converts them X and Y offsets to compute a predicted Position.
- Geometry: Given neighbor Node's positions and distances, the Geometry module computes one or more candidate Positions of the local Node.
- Motion: Given inertial inputs, the Motion module computes whether the local Node is in motion and it computes the direction of travel.

Geometry Module (GEO): GEO uses neighbor Node positions and distances to compute one or more candidate Positions for the local Node. Neighbor positions are provided by the NHM and distances to nearby Nodes are provided by Distance measurement; both are delivered as sensor readings. These are combined into a list of Neighbor Descriptors (ND).

GEO recalculates the estimated position at the same rate as Distance measurement is able to provide distances updates. Each Node implementation may have different Distance measurement technology and thus the update rates vary by Node.

Figure 2:
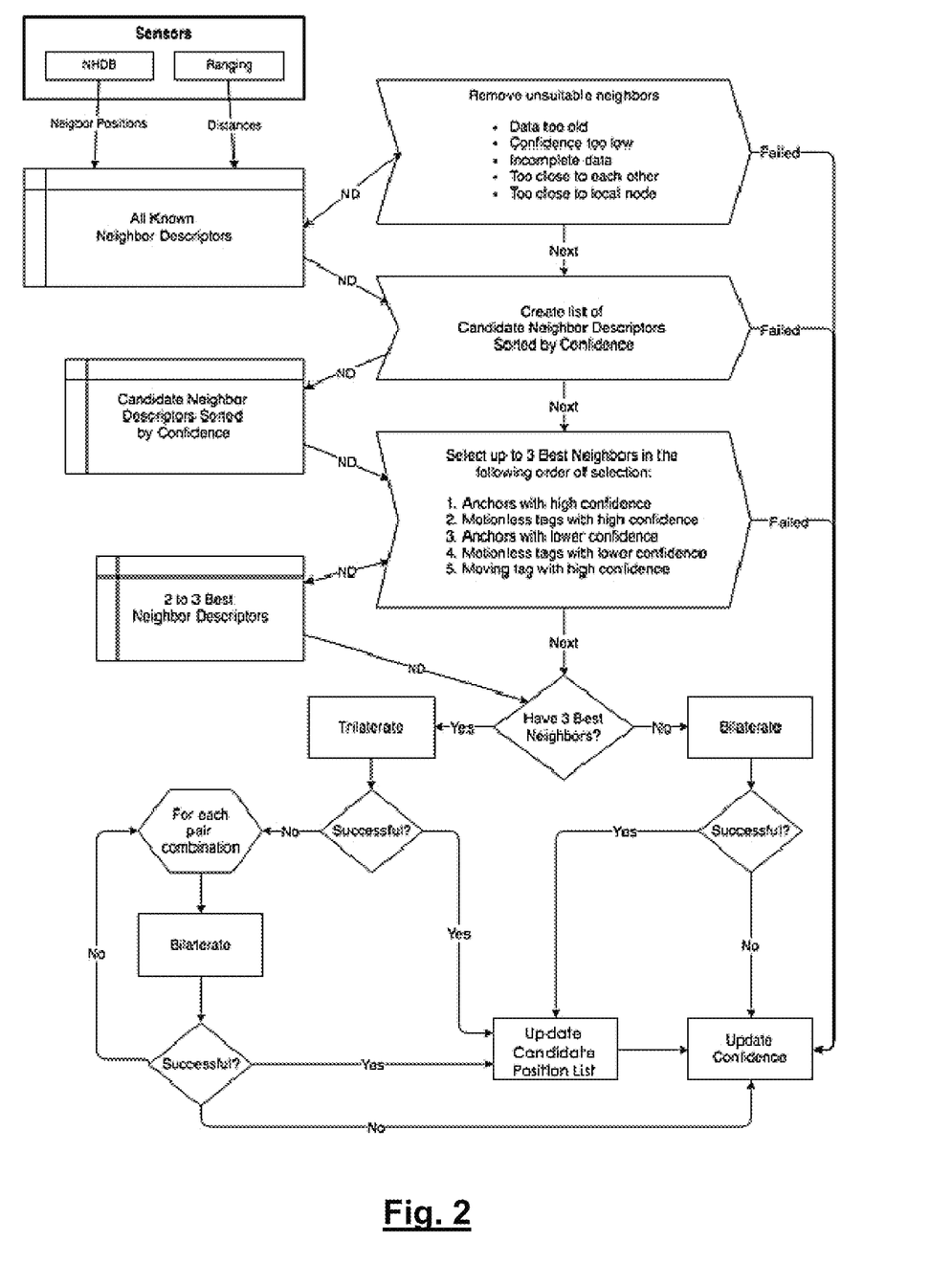
FIG. 2 is a diagrammatic illustration of an embodiment of the methods of the present invention.

GEO's position calculation is shown in the flow chart shown in FIG. 2 and summarized below:
1. Remove unsuitable neighbors from the ND List. Desirable neighbors are those with high confidence, recent position and distance data, and are positioned favorably. Some examples of favorable and unfavorable geometry are illustrated in FIG. 8-FIG. 14.
2. Calculate interpolated position of Tag neighbors.
3. Sort ND List by confidence.
4. Select up to three best neighbors based on role (preferring Anchors over non-moving Tags over moving Tags) and Confidence.
5. If there are only two neighbors, attempt to use Bilateration to calculate two candidate Positions.
6. If there are three neighbors, attempt to use Trilateration to calculate a single candidate Position. If Trilateration fails, attempt to use to Bilateration on each neighbor pair combination to calculate several pairs of candidate Positions.
7. Report the list of candidate Positions to the INS module. Each of the above steps may end the calculation due to an insufficient number of usable neighbors. In such cases GEO will report the previously calculated position with a reduced confidence. Thus, as time passes without enough neighbors, GEO's reported position confidence decreases.

Trilateration/Bilateration

Figure 3:
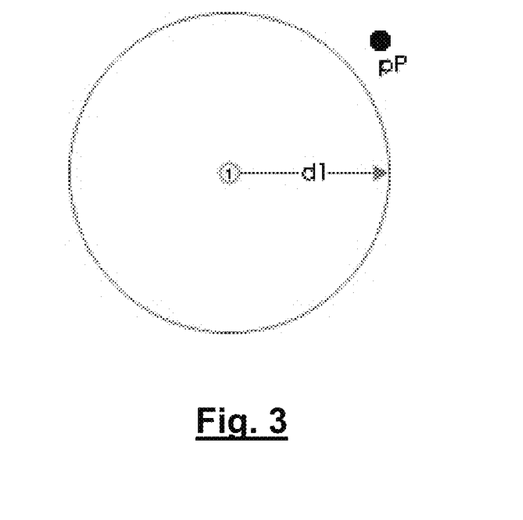
FIG. 3 illustrates the ambiguity of distance measurement with only one available reference node resulting in infinite number of candidate positions along the circumference of the circle.

Given one Anchor and a Tag and a distance between them of d1 all that is possible is to say that the Tag lies somewhere on the circle with it center at Anchor 1 with radius d1. This information is not sufficient to calculate a finite list of candidate Positions. However, having the predicted Position pP from the INS module, it is possible to adjust the associated Confidence. If pP lies on the circle or near it, its Confidence can be increased. If pP is far from the circle, its confidence can be decreased.

Figure 4:
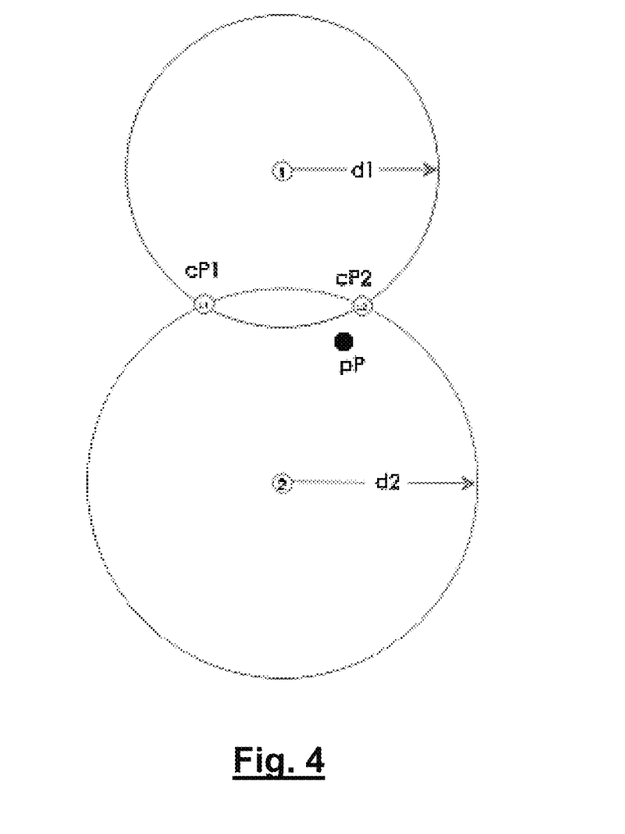
FIG. 4 shows reduction in ambiguity with two available reference nodes with favorable geometry, resulting in two candidate positions at Circle-Circle intersections.

Given two Anchors and a Tag and the distances to the Anchors d1 and d2, we can calculate two possible candidate Positions cP1 and cP2 at the intersections of the two circles around the Anchors as shown in FIG. 4. Having a predicted Position pP from the INS module, the closer candidate Position can be chosen over the other (cP2 in the illustrated case). As in the previous example, the magnitude of the distance between cP2 and pP can be used as the basis for adjusting Confidence.

Figure 5:
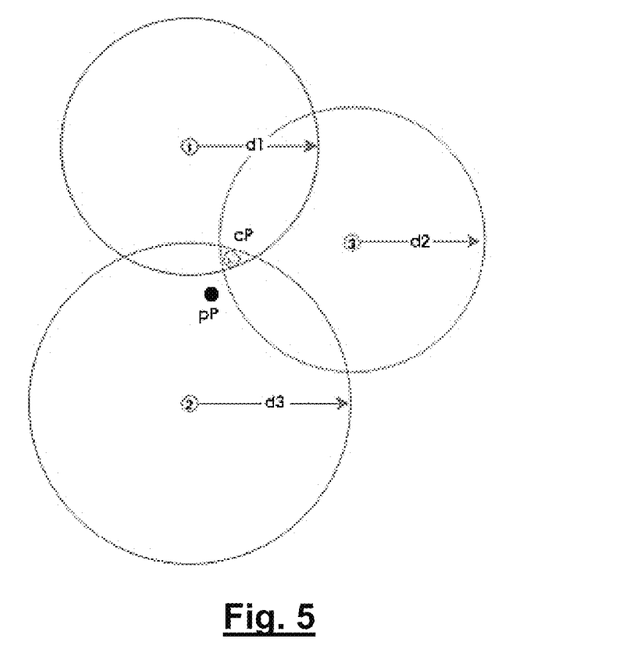
FIG. 5 shows further reduction in ambiguity to a single candidate position when three reference nodes with favorable geometry are available.

With three anchors it is possible to calculate a single candidate Position cP of the tag to be at the center of the intersection of all three circles. This scenario is illustrated in FIG. 5. Like in previous examples, the magnitude of the distance between cP and pP, especially as it compares to the inherent Precision of the distance measuring technology being used, can be evaluated to adjust Confidence.

Distance Measurement Errors

Figure 6:
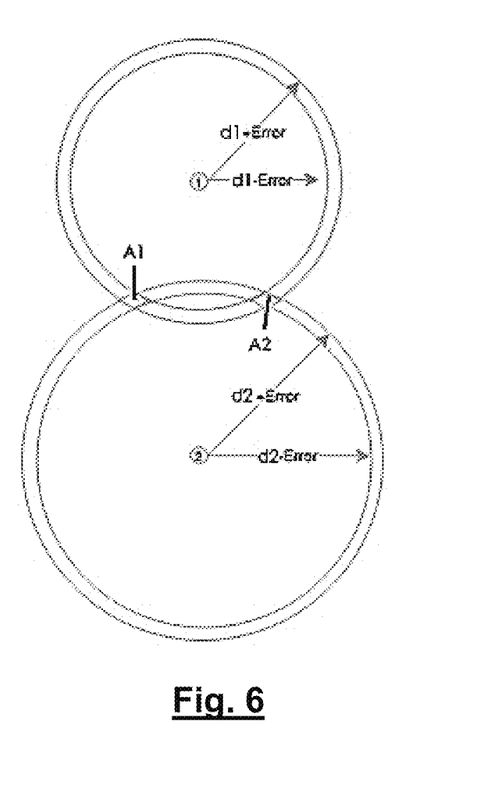
FIG. 6 illustrates effects of Precision with two reference nodes.

Distance measurement radios are not perfect so it may be advantageous to account for the distance measurement errors. In the two-anchor case the candidate Positions will lie somewhere in the areas of intersection A1 and A2 of the four circles around the anchors with radii d1−Error, d1+Error, d2−Error and d2+Error, as shown in FIG. 6. The magnitude of Error is typically proportional to the inherent Precision of the distance measuring technology, however any single distance measurement can have significantly greater Error due to environmental factors such as obstructions, reflections, interference and the like.

Figure 7:
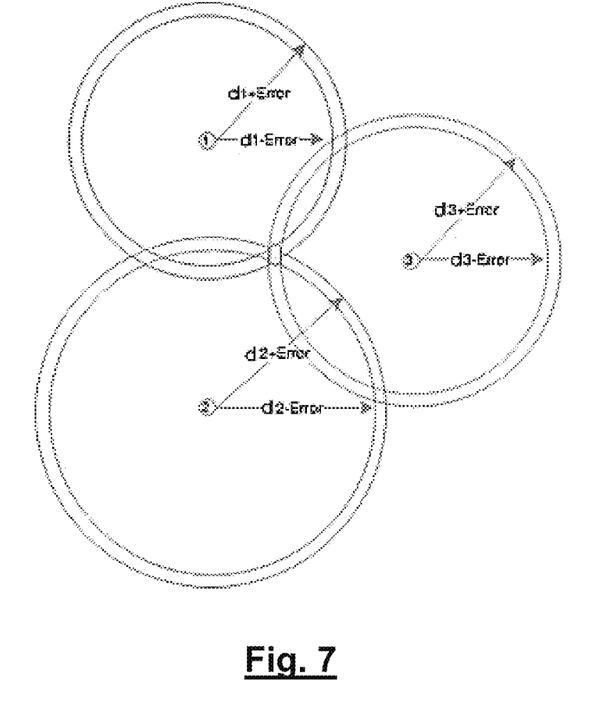
FIG. 7 shows effects of Precision with three reference nodes.

With three anchors the location is in the area of the intersection of the six resulting circles as shown in FIG. 7.

Figure 8:
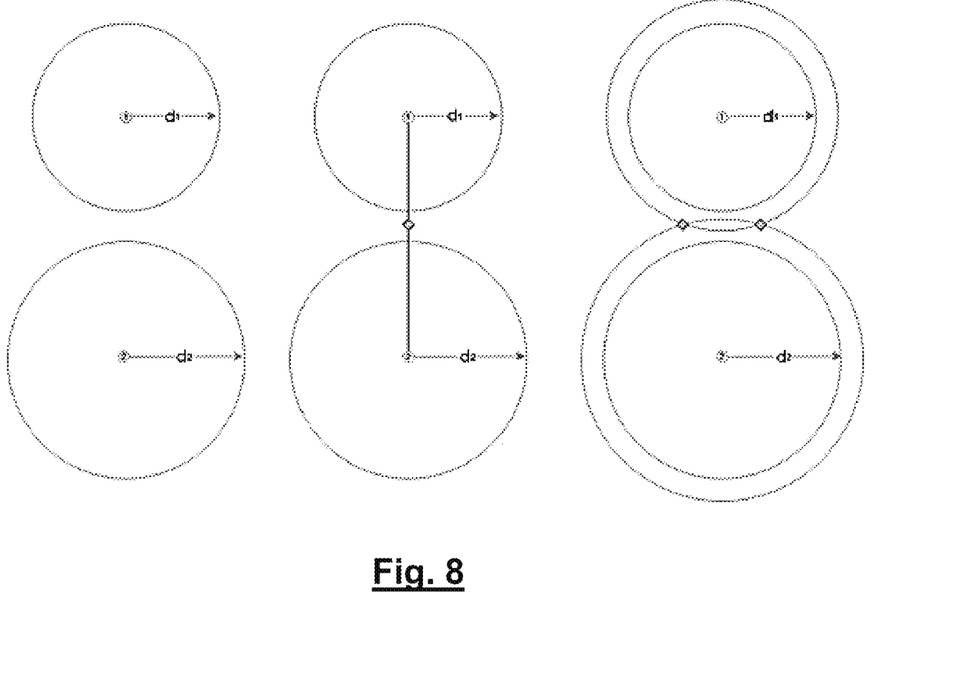
FIG. 8 shows effects of erroneous measurements and unfavorable geometry resulting in non-intersection of circles.

Distance measurement errors can also create situations where the resulting circles do not intersect, preventing calculation of position. This would be termed disadvantageous geometry within the context of the illustrated embodiment. Some examples of this are illustrated in FIG. 8.

If the circles are not too far apart then it is possible to create a lower confidence estimate by calculating the center position between the circles. Another alternative is to enlarge the radius by an acceptable error delta to see attempt to create intersection circles. Different embodiments may use one of these approaches or other similar methods.

Figure 9:
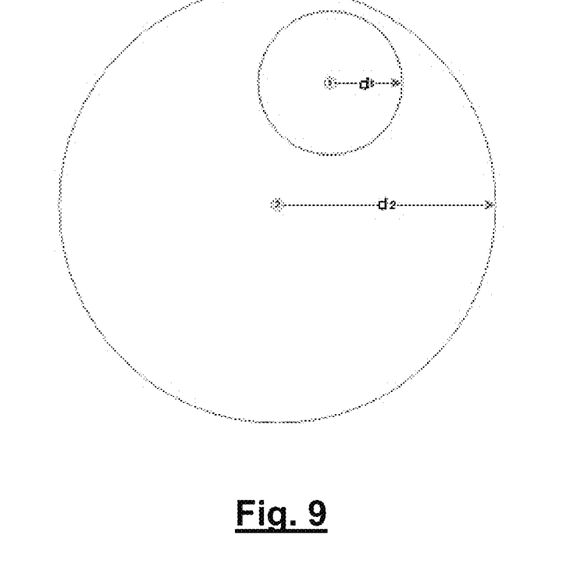
FIG. 9 shows effects of erroneous measurements and unfavorable geometry with non-intersecting circles when one circle is fully contained in another.
Figure 10:
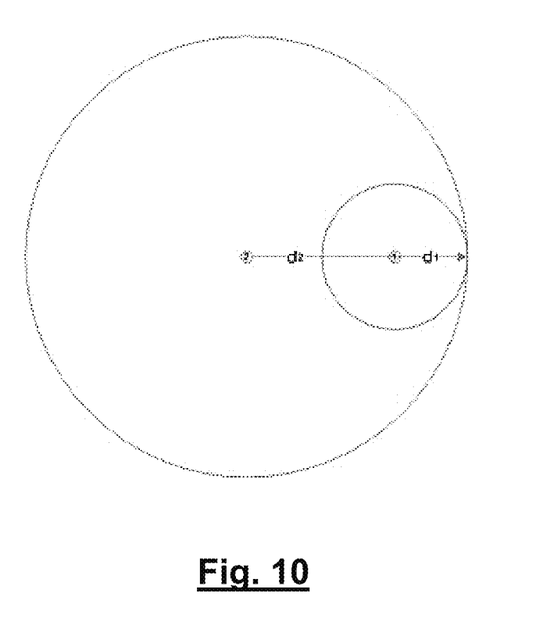
FIG. 10 shows unfavorable geometry with tangent circles.

FIG. 9 and FIG. 10 illustrate other examples of unfavorable geometry as a result of errors in measured distances. In the illustrated embodiment, such measurements would typically be discarded if other measurements that produce desirable circle intersections are available. If no better measurements are available and unfavorable geometry is used, Confidence will be reduced proportionately to the amount of error detected, and, in some embodiments, as it relates to Precision.

Inertial Navigation Module (INS)

INS takes inertial inputs from the IMU and converts them X and Y offsets and adds them to the previous position to compute a new predicted Position and associated Confidence. A large amount of inertial activity will reduce Confidence, while little or no detected inertial activity will, in some embodiments, increase Confidence.

A second function of the INS is to receive a list of geometric candidate Positions from the GEO module, and select among them based on distance from predicted Position and relative Confidence. In some scenarios, the predicted Position may be selected over all candidate Positions. In other scenarios, a new position may be calculated that is a weighted average of the closest candidate Position and predicted Position, with weights being at least in part proportional to respective Confidence.

Motion Module (MOT)

MOT takes inertial inputs from INS and computes whether the local Node is in motion and it computes the direction of travel (bearing). The result of motion computation may be used to adjust Confidence of the node's Position and also may be used to switch node roles between Anchor, Breadcrumb and Tag. Node roles are used by the GEO module as criteria for selecting most favorable sets of distance measurements, with the highest preference being given to Anchors, then Breadcrumbs, then Tags. A Breadcrumb, within the context of the illustrated embodiment, is a Tag that has been stationary for an extended period of time. The primary difference between an Anchor and a Breadcrumb, in the illustrated embodiment, is that an Anchor's position is explicitly known and assigned when the Anchor is placed. A Breadcrumb's position was calculated when it was moving as a Tag, but has higher Confidence than that of a moving Tag due to having been stationary and having the benefit of a number of repetitive measurements being considered over time to reduce error.

Figure 11:
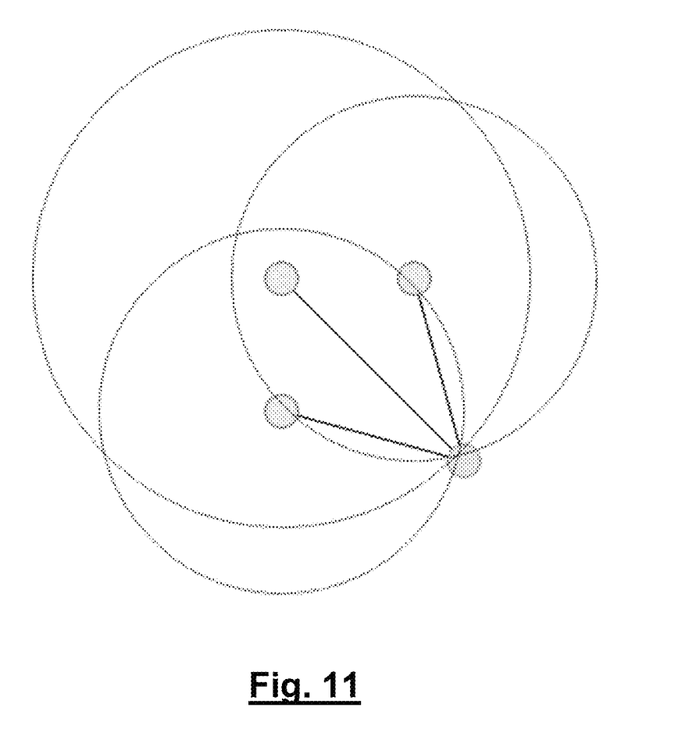
FIG. 11 shows favorable geometry with three reference nodes.

FIG. 11 shows an example of favorable geometry with three distance measurements producing a well defined intersection. This scenario would result in increased Confidence.

Figure 12:
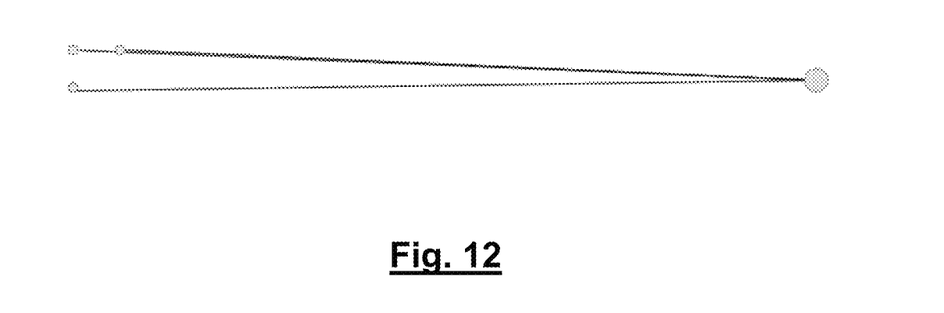
FIG. 12 is an example of unfavorable geometry with three reference nodes.

As a Tag moves away from a set of Anchors, accuracy diminishes due to the resultant unfavorable geometry. Such a scenario is illustrated in FIG. 12. In this example, Confidence would be decreased.

Figure 13:
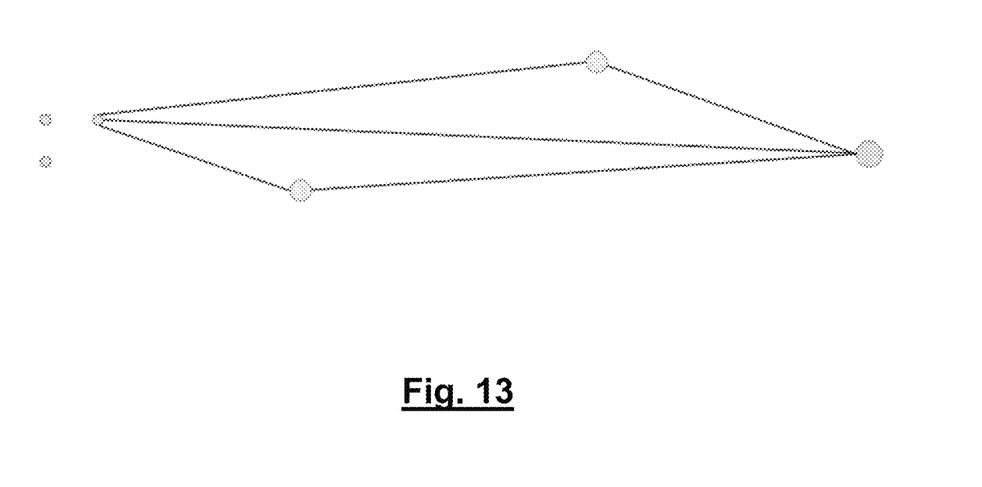
FIG. 13 illustrates choosing reference nodes with favorable geometry over those with unfavorable geometry.

The scenario illustrated in FIG. 12 can be mitigated by the introduction of intermediate reference nodes at certain distances and locations along the path of travel. Such nodes can be Anchors, Breadcrumbs or other Tags. As described previously, the node role will have an effect on the Confidence of a Position that is calculated using those references. This is illustrated in FIG. 13, with reference nodes having favorable geometry being chosen as references over those that have unfavorable geometry.

In practice, such additional nodes can be carried by the user and placed at selected locations along the path of travel.

Figure 14:
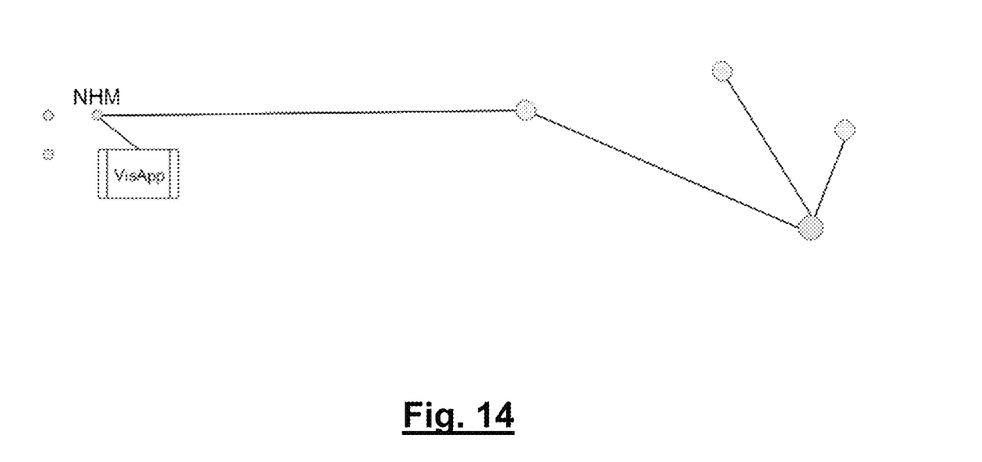
FIG. 14 shows choosing nearby reference nodes over distant ones.

FIG. 14 illustrates a scenario where a Tag has moved out of range of the original set of Anchors and is only using the nearby Breadcrumbs for determining Position.

According to a particular embodiment, the method of determining a new Position for a Node n, said Node having a distance measuring radio, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) Electronically measuring at least a first distance Dn1 to at least a first other Node n1, and at least a second distance Dn2 to at least a second other Node n2, c) Obtaining the current Position Pn1 of at least said first other Node and Position Pn2 of at least said second other Node, said Position comprising at least X, Y, Z coordinates and a Confidence metric Cn1 and Cn2, d) Geometrically projecting the distances Dn1 and Dn2 onto a common horizontal plane, to determine projected distances pDn1 and pDn2, e) Calculating Circle-Circle Intersections of said projected distances to determine two candidate Positions cPa and cPb, f) Determining a candidate Confidence cC as the lesser of Cn1 and Cn2, then adjusting said Confidence cC based on geometric conditions of the calculations in step e), g) Determining the error distance eDa between pP and cPa, and error distance eDb between pP and cPb, h) Choosing the candidate Position with the lesser error distance as the candidate Position cP, i) If confidence cC is greater than pC, choosing candidate position cP as new position P and taking cC as the new confidence C, otherwise choosing predicted position pP as new position P and predicted confidence pC as new confidence C.

According to a particular embodiment, the method of determining a new Position for a Node n, said Node having a distance measuring radio, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) Electronically measuring at least a first distance Dn1 to at least a first other Node n1, at least a second distance Dn2 to at least a second other Node n2, and at least a third distance Dn3 to at least a second other Node n3, c) Obtaining the current Position Pn1 of at said first other Node, Position Pn2 of said second other Node, and Position Pn3 of said third other Node, said Position comprising at least X, Y, Z coordinates and a Confidence metric Cn1, Cn2 and Cn3, d) Using trilateration with positions Pn1, Pn2 and Pn3 and corresponding measured distances Dn1, Dn2 and Dn3 to determine at least a candidate Position cP, e) Determining a candidate Confidence cC as the lesser of Cn1, Cn2 and Cn3, then adjusting said Confidence cC based on geometric conditions of the calculations in step d), f) If confidence cC is greater than pC, choosing candidate position cP as new position P and taking cC as the new confidence C, otherwise choosing predicted position pP as new position P and predicted confidence pC as new confidence C.

According to a particular embodiment, the method of determining a new Position for a Node n, said Node having a distance measuring radio, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) Electronically measuring at least a first distance Dn1 to at least a first other Node n1, and at least a second distance Dn2 to at least a second other Node n2, c) Obtaining the current Position Pn1 of at least said first other Node and Position Pn2 of at least said second other Node, said Position comprising at least X, Y, Z coordinates and a Confidence metric Cn1 and Cn2, d) Geometrically projecting the distances Dn1 and Dn2 onto a common horizontal plane, to determine projected distances pDn1 and pDn2, e) Calculating Circle-Circle Intersections of said projected distances to determine two candidate Positions cPa and cPb, f) Determining a candidate Confidence cC as the lesser of Cn1 and Cn2, then adjusting said Confidence cC based on geometric conditions of the calculations in step e), g) Determining the error distance eDa between pP and cPa, and error distance eDb between pP and cPb, h) Choosing the candidate Position with the lesser error distance as the candidate Position cP and the corresponding error distance as the error distance eD, i) Calculating new position P as a weighted interpolation between at least the predicted position pP and candidate position cP, j) Calculating new confidence C as a weighted interpolation of predicted confidence pC and candidate confidence cC.

According to a particular embodiment, the method of determining a new Position for a Node n, said Node having a distance measuring radio with an associated Precision, said method comprising the steps of:

a) Starting with a previously determined previous Position P, said previous Position having a previously determined Confidence C, calculating a predicted Position pP, and an associated predicted Confidence pC, said calculations utilizing data from at least a 3-axis Inertial sensor, b) Electronically measuring at least a first distance Dn1 to at least a first other Node n1, at least a second distance Dn2 to at least a second other Node n2, and at least a third distance Dn3 to at least a second other Node n3, c) Obtaining the current Position Pn1 of at said first other Node, Position Pn2 of said second other Node, and Position Pn3 of said third other Node, said Position comprising at least X, Y, Z coordinates and a Confidence metric Cn1, Cn2 and Cn3, d) Using trilateration with positions Pn1, Pn2 and Pn3 and corresponding measured distances Dn1, Dn2 and Dn3 to determine at least a candidate Position cP, e) Determining a candidate Confidence cC as the lesser of Cn1, Cn2 and Cn3, then adjusting said Confidence cC based on geometric conditions of the calculations in step d), f) Calculating new position P as a weighted interpolation between at least the predicted position pP and candidate position cP, g) Calculating new confidence C as a weighted interpolation of predicted confidence pC and candidate confidence cC.

The nodes n1 and n2 and n3 (in the third and fourth embodiments) are chosen from among a plurality of available nodes based at least on corresponding Confidence.

The nodes n1 and n2 and n3 (in the third and fourth embodiments) are chosen from among a plurality of available nodes based at least on the geometry of their corresponding positions relative to previous position P of said node n.

The embodiments disclosed herein are illustrative and not limiting; other embodiments shall be readily apparent to those skilled in the art based upon the disclosures made herein, without departing from the scope of the present invention.

The invention claimed is:

1. A method of determining a new position for a node, the node having a distance measuring radio, the method comprising:
   a) starting with a previously determined position having a previously determined confidence C, and calculating a predicted position and an associated predicted confidence utilizing data from at least a 3-axis inertial sensor;
   b) electronically measuring a first distance to a first other node and a second distance to a second other node;
   c) obtaining a first current position of the first other node comprising at least X, Y, Z coordinates and a first confidence metric, and obtaining a second current position of the second other node comprising at least X, Y, Z coordinates and a second confidence metric;
   d) geometrically projecting the first distance and the second distance onto a common horizontal plane, to respectively determine a first projected distance and a second projected distance;
   e) calculating circle-circle intersections of the first projected distance and the second projected distance to respectively determine a first candidate position and a second candidate position;
   f) determining a candidate confidence as the lesser of the first confidence metric and the second confidence metric, then adjusting the candidate confidence based on geometric conditions of the calculations in step e);
   g) determining a first error distance between the predicted position and the first candidate position, and determining a second error distance between the predicted position and the second candidate position;
   h) comparing the first error distance of the first candidate position and the second error distance of the second candidate position, and selecting one with a lower error distance as a candidate position; and i) if the candidate confidence of the candidate position is greater than the predicted confidence, then the candidate position is selected as the new position and the candidate confidence is selected as a new confidence, otherwise the predicted position is selected as the new position and the predicted confidence is selected as the new confidence.

2. The method of claim 1, wherein the first other node and the second other node are selected from among a plurality of available nodes based at least on a corresponding confidence.

3. The method of claim 1, wherein the first other node and the second other node are selected from among a plurality of available nodes based at least on a geometry of their corresponding positions relative to a previous position of the node.

4. A method of determining a new position for a node, the node having a distance measuring radio, the method comprising:

a) starting with a previously determined previous position having a previously determined confidence, and calculating a predicted position and an associated predicted confidence utilizing data from at least a 3-axis inertial sensor;

b) electronically measuring a first distance to a first other node, a second distance to a second other node and a third distance to a third other node;

c) obtaining a first current position of the first other node comprising at least X, Y, Z coordinates and a first confidence metric, obtaining a second current position of the second other node comprising at least X, Y, Z coordinates and a second confidence metric, and obtaining a third current position of the third other node comprising at least X, Y, Z coordinates and a third confidence metric;

d) using trilateration with the first, second and third current positions and the corresponding first, second and third distances to determine at least a candidate position;

e) determining a candidate confidence as the lesser of the first confidence, the second confidence and the third confidence, then adjusting the confidence based on geometric conditions of the calculations in step d); and f) if the candidate confidence is greater than the predicted confidence, then the candidate position is selected as the new position and the candidate confidence is selected as a new confidence, otherwise the predicted position is selected as the new position and the predicted confidence is selected as the new confidence C.

5. The method of claim 4, wherein the first other node and the second other node are selected from among a plurality of available nodes based at least on a corresponding confidence.

6. The method of claim 4, wherein the first other node and the second other node are selected from among a plurality of available nodes based at least on a geometry of their corresponding positions relative to a previous position of the node.

7. A method of determining a new position for a node, the node having a distance measuring radio, the method comprising:

a) starting with a previously determined previous position having a previously determined confidence, and calculating a predicted position and an associated predicted confidence utilizing data from at least a 3-axis inertial sensor;

b) electronically measuring a first distance to a first other node and a second distance o a second other node;

c) obtaining a first current position of the first other node comprising at least X, Y, Z coordinates and a first confidence metric, and a second current position of the second other node comprising at least X, Y, Z coordinates and a second confidence metric;

d) geometrically projecting the first distance and the second distance onto a common horizontal plane, to respectively determine a first projected distance and a second projected distance;

e) calculating circle-circle intersections of the first projected distance and the second projected distance to respectively determine a first candidate position and a second candidate position;

f) determining a candidate confidence as the lesser of the first confidence metric and the second confidence metric, then adjusting the candidate confidence based on geometric conditions of the calculations in step e);

g) determining a first error distance between the predicted position and the first candidate position, and determining a second error distance between the predicted position and the second candidate position;

h) comparing the first error distance of the first candidate position and the second error distance of the second candidate position, and selecting one with a lower error distance as a candidate position and the corresponding error distance as an error distance;

i) calculating the new position as a weighted interpolation between the predicted position and the candidate position; and j) calculating a new confidence as a weighted interpolation of the predicted confidence and the candidate confidence.

8. The method of claim 7, wherein the first other node, the second other node and the third other node are selected from among a plurality of available nodes based at least on a corresponding confidence.

9. The method of claim 7, wherein the first other node, the second other node and third other node are chosen from among a plurality of available nodes based at least on a geometry of their corresponding positions relative to a previous position of the node.

10. A method of determining a new position for a node, the node having a distance measuring radio with an associated precision, the method comprising:

a) starting with a previously determined previous position having a previously determined confidence, calculating a predicted position and an associated predicted confidence utilizing data from at least a 3-axis inertial sensor;

b) electronically measuring a first distance to a first other node, a second distance to a second other node, and a third distance to a third other node;

c) obtaining a first current position of the first other node comprising at least X, Y, Z coordinates and a first confidence metric, a second current position of the second other node comprising at least X, Y, Z coordinates and a second confidence metric, and a third current position of the third other node comprising at least X, Y, Z coordinates and a third confidence metric;

d) using trilateration with the first, second and third positions and the corresponding first, second and third distances to determine at least a candidate position;

e) determining a candidate confidence as the lesser of the first confidence, the second confidence and the third confidence, then adjusting the confidence based on geometric conditions of the calculations in step d);
f) calculating the new position as a weighted interpolation between the predicted position and the candidate position; and
g) calculating a new confidence as a weighted interpolation of the predicted confidence and the candidate confidence.

11. The method of claim 10, wherein the first other node, the second other node and the third other node are selected from among a plurality of available nodes based at least on a corresponding confidence.

12. The method of claim 10, wherein the first other node, the second other node and third other node are chosen from among a plurality of available nodes based at least on a geometry of their corresponding positions relative to a previous position of the node.

* * * * *